Jan. 5, 1954  R. C. MILLER  2,664,914
SELF-REGULATING FLOW CONTROL VALVE
Filed April 25, 1950  3 Sheets-Sheet 1

INVENTOR
Robert C. Miller,
BY Mason, Porter, Diller & Stewart
ATTORNEYS

Jan. 5, 1954 R C. MILLER 2,664,914
SELF-REGULATING FLOW CONTROL VALVE
Filed April 25, 1950 3 Sheets-Sheet 2

INVENTOR
Robert C. Miller;
BY Mason, Porter, Millett Stewart
ATTORNEYS.

Jan. 5, 1954　　　　　R. C. MILLER　　　　　2,664,914
SELF-REGULATING FLOW CONTROL VALVE
Filed April 25, 1950　　　　　　　　　　　　3 Sheets—Sheet 3
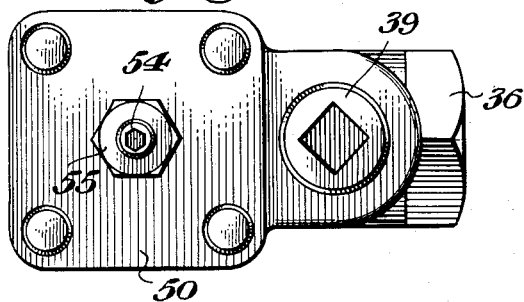
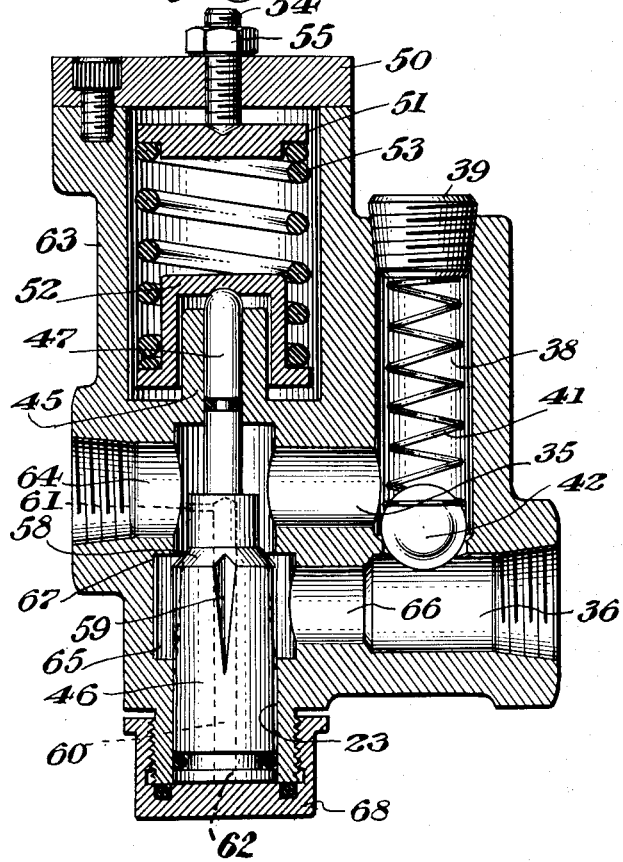
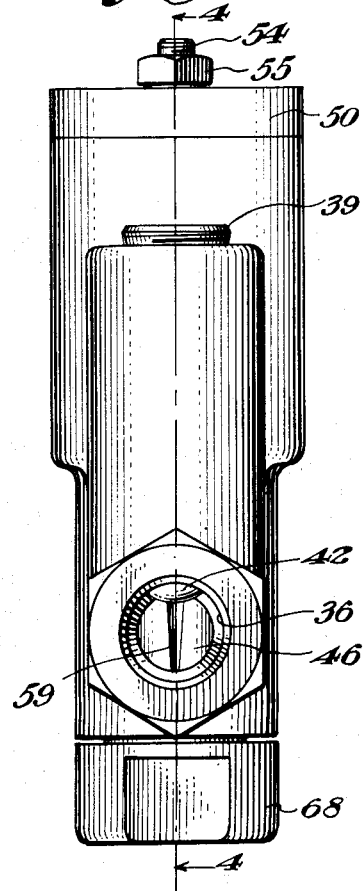
INVENTOR
*Robert C. Miller*
BY *Mason, Porter, Miller & Stewart*
ATTORNEYS Patented Jan. 5, 1954

2,664,914

UNITED STATES PATENT OFFICE 2,664,914

SELF-REGULATING FLOW-CONTROL VALVE

Robert C. Miller, Benton Harbor, Mich., assignor to Benton Harbor Engineering Works, Inc., Benton Harbor, Mich., a corporation of Michigan Application April 25, 1950, Serial No. 157,985

4 Claims. (Cl. 137—505)

The following specification relates to a novel self-regulating flow-control valve serving to throttle down or meter out fluids under pressure, such as hydraulic liquids and the like.

The device finds its principal utility in the control of reciprocating rams or pistons such as used for hydraulic lift mechanisms.

In the operation of reciprocating machines such as rams or hydraulic lifts, hydraulic fluid under considerable pressure is applied in the advancing or lifting operation. The load or resistance may vary between wide limits and reach a high maximum. The corresponding pressure must be applied over an equally large range. After the completion of the advancing movement or discharge of the lifted load, the retraction or lowering of the hydraulic lift or ram may be accelerated. However, if the load is also being lowered, the discharge of the hydraulic fluid must be held under strict control. This is accomplished by close regulation of the rate of flow as the discharge passes the regulating flow-control mechanism.

I have provided a self-regulating flow-control valve to maintain the desired rate of flow. It is thus an object of my invention to control the speed of the reciprocating piston in its retraction.

The object of my invention is to provide a means of regulating the metering out or discharge rate of flow of fluid under pressure, from a hydraulic cylinder, which will give a predetermined rate of discharge in relation to infinitely different pressures that might exist in the hydraulic cylinder or circuit, due to infinitely different loads that might be opposing the movement of the piston in the hydraulic cylinder.

Another object of my invention is to provide a form of rate of flow-control valve that will not be affected in its proper precalculated self regulation by the decrease in pressure on the outlet side of the valve.

A further object of my invention is to provide full unrestricted flow in one direction.

It is also an object of my invention to provide a form of rate of flow-control valve that will not be affected in its self regulation by reversal of flow or stoppage of flow and because of this will not create surge in the hydraulic circuit by reversal of flow, but will suppress surge.

It has also been an object of my design and invention to provide the rate of flow-control valve with a moving valve member that will not be affected by pressure changes or reversal of flow or stoppage of flow in its normal movement so that its motion will be smooth and accurate.

My preferred form of application of my rate of flow-control valve is to provide a form of self regulation for the escapement of hydraulic fluid from a vertically operated hydraulic cylinder which is used to raise, to hold and or to lower various loads which might be suspended on the piston of the cylinder, such as in lift trucks or kindred forms of hydraulic elevating machines.

It is a further object of my invention to vary the rate of movement in accordance with the needs of the load sustained by the piston in the retracting movement.

It is also an object of my invention to provide means for the above purposes which shall be unaffected by stoppage in the flow of pressure fluid and during the maintenance of holding pressure.

Among the objects of my invention is to allow unrestricted speed of reciprocation under full pressure flow, in upward movement of ram or piston.

Finally, it is an incidental purpose of my invention to eliminate pulsating surge in the valve mechanism and the hydraulic circuit when the ram or piston is retracted or load is lowered by reversal of flow of the hydraulic fluid.

Other incidental objects of my invention will be apparent from the following description of the preferred form as illustrated by way of example in the accompanying drawings in which Fig. 1 is a longitudinal vertical section of an hydraulic piston and the associated mechanism including the improved flow-control valve;

Fig. 4 is a vertical cross-section of a modified form taken on the line 4—4 of Fig. 5;

Fig. 5 is an end elevation of the same;

Fig. 6 is a top plane view of the same and

Fig. 7 is a schematic diagram of the hydraulic lifting mechanism and associated parts in which the flow-control or rate-of-flow valve is intercalated.

Figure 1:
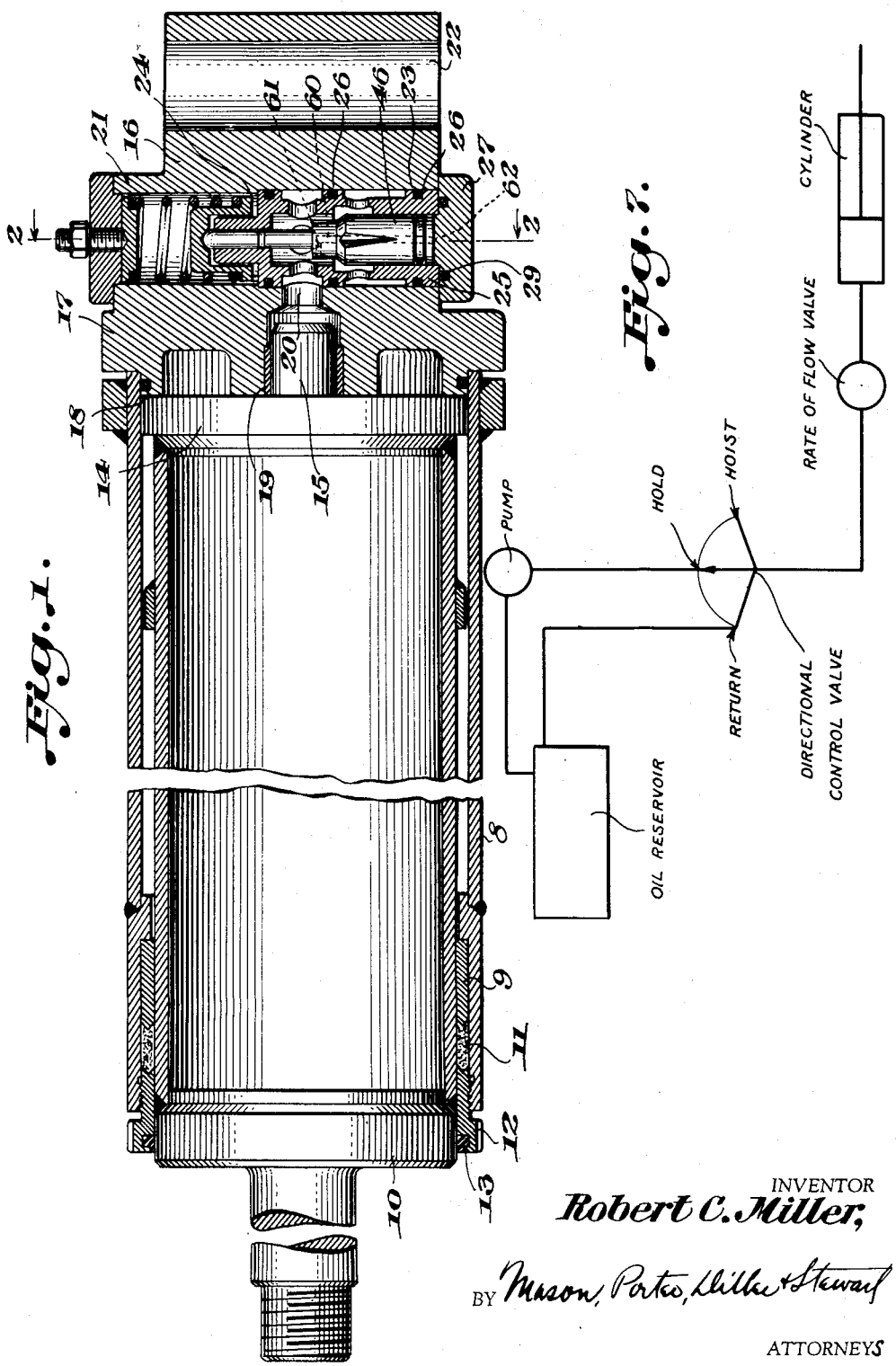

In illustrating the principle of the invention, I have shown on the accompanying drawings a hydraulic ram for a fork lift which is operated under the control of my improved self-regulating flow-control valve. In this arrangement the lifting cylinder 8 is provided with a suitable bearing 9 for a reciprocating piston rod 10. The latter is shown in fully retracted position from which it is designed to be extended carrying the load upwardly or outwardly as the case may be. A packing 11 fits around the cylindrical piston rod 10 and is held in place by a gland nut 12. A piston rod wiper 13 is set in the inner periphery of the gland nut.

The opposite end of the piston rod has a piston head 14 adapted to have a sliding fit within the cylinder 8. A boss 15 is mounted as an extension centrally of the piston head 14.

The base 16 of the hydraulic ram or lift is formed with a cylinder head 17. This head is permanently attached to the cylinder 8. A packing ring 18 is fitted between the two members to prevent loss of the high pressure utilized. The cylinder head 17 carries a cushioning bushing 19 for the boss 15.

A port 20 forms a passageway through the cylinder beyond the boss 15.

The hydraulic fluid under high pressure is delivered to the port 20 through the self-regulating flow-control valve which forms the particular feature of my invention. While this may be mounted at any convenient point on the hydraulic feed line, I prefer to mount it as an integral part of the cylinder head 17 and base 16.

The control device consists of a valve mechanism assembled within a valve casing 21. This valve casing may have a journal bearing 22 or other means by which it is held in place on the operating foundation. The casing is bored transversely to provide a transverse chamber 23. This chamber intersects the port 20 and has an intermediate shoulder 24 due to the fact that the chamber has a wider diameter on one side than on the other. The portion of the chamber having a greater diameter contains a valve cage 25. This cage fits closely within the chamber 23 and a series of packing rings 26 serve to prevent escape of hydraulic fluid.

The valve cage 25 is fastened in place against the inner shoulder 24 by an end cap 27 and suitable screws 28. This cap is equipped with a packing ring 29 which also prevents loss of pressure fluid.

The valve cage 25 has a valve chamber 30 running longitudinally therethrough. The outer periphery of the cage has an upper or inlet channel 31 which surrounds the cage. A series of ports 32 connect the channel with the valve chamber 30. It will be noticed that the channel 31 is located directly opposite the port 20.

A lower or outlet channel is also provided peripherally of the cage as shown at 33. A series of ports 34 connect this channel with the valve chamber 30.

Figure 2:
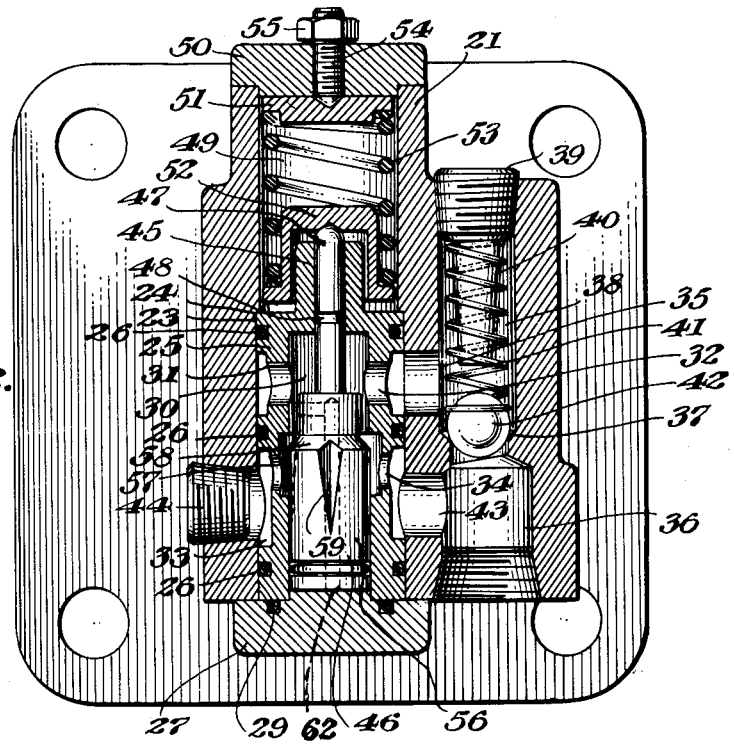
Fig. 2 is a transverse vertical section through the flow-control valve taken on the line 2—2 of Fig. 1.
Figure 3:
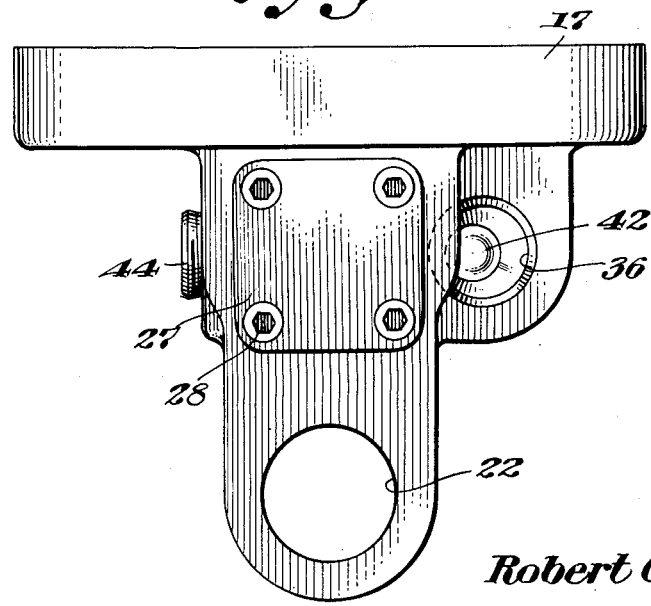
Fig. 3 is a bottom view of the flow-control valve assembly.

Opposite the channel 31 and as shown in Fig. 2, the valve casing 21 has an inlet duct 35. There is also an inlet pipe 36 in the valve casing leading to the inlet duct 35 through a check valve seat 37.

The inner side of the check valve seat is formed as a spring chamber 38. This chamber is closed by aid of a cap plug 39. The cap plug has a central stop pin 40 on which an expansion spring 41 is mounted. A ball check valve 42 movable to and from the seat 37 is held in closed position by means of the spring 41.

Referring to Fig. 2 it will be seen that the valve casing is bored transversely to form a discharge duct 43 which connects the inlet pipe 36 with the lower channel 33 in the cage. The outer end of the duct is closed permanently by means of plug 44.

The valve cage 25 is extended at its inner end to form a center bearing 45.

The valve proper consists of a plunger 46 slidably carried within the valve chamber 30. This valve plunger 46 has a rod 47 extending at the inner end and journaled in the bearing 45. The rod extends entirely through the center bearing. A packing ring 48 is carried by the rod 47 to prevent loss of hydraulic fluid through the bearing. The transverse chamber 23 is extended beyond the inner shoulder 24 to provide a spring housing 49. The housing is closed by an end cap 50, but it is understood that in operation the spring housing is at substantially low or atmospheric pressure. A spring plate 51 is loosely mounted within the cap 50. At the opposite end of the spring housing, there is a spring cap 52. This cap surrounds the extension of the center bearing 45 of the valve cage. Centrally, the cap forms a thrust bearing for the rod 47.

The cap is flanged as shown in Fig. 2 to form an abutment for a coil expansion spring 53.

A headless set screw 54 is threaded centrally through the end cap 50 and held in adjusted position by means of the jam nut 55. The screw 54 applies adjustable pressure against the spring plate 51. In this way pressure is indirectly applied through the spring to the valve proper 46.

The valve plunger 46 has a broad end opposite the rod 47. This broad end 56 fits closely within the valve chamber 30 to form a dash-pot. The valve chamber 30 has an intermediate peripheral channel 57 connecting with the ports 34 in the lower outlet channel. The edge between this channel 57 and the inner face of the valve chamber 30 forms a valve seat past which the broad end 56 may pass in a closing movement of the valve. A tapered shoulder 58 on the broad end 56 forms the valve face which has a sliding fit on this seat.

A series of tapering grooves 59 are cut in the outer surface of the valve plunger. As the shoulder 58 rises past the seat, the effective opening of the grooves is varied to adjust the escape from the high side to the lower (return) side.

Referring to Fig. 1 it will be seen that the valve plunger 46 is bored axially to provide a central passageway 60. This passageway begins at the base or end of the plunger and runs to a point beyond the tapered shoulder 58. A radial outlet passageway 61 connects passageway 60 at its upper end with the high pressure end of the valve chamber 30.

As shown, the passageway 61 is of smaller diameter than the passageway 60. The element 61 therefore serves as a metering device for the passage of hydraulic fluid to the central passageway 60. Since the latter is of larger diameter, it minimizes pulsation or surging as it delivers fluid pressure to the dash-pot 62 at the end of the plunger 46.

While the above description relates particularly to the flow-control valve when assembled with the ram or lift, the valve may be installed elsewhere, for example in the high pressure fluid line between the operating cylinder and the reversing control valve. When thus installed, it may be constructed as shown in Figs. 4, 5 and 6.

A valve casing 63 is provided with associated parts similar to those described above. The casing has an inlet pipe 36 and an outlet port 64. High pressure hydraulic fluid is brought in through pipe 36 and delivered through port 64 to the moving cylinder.

A transverse chamber 23 is provided in which the valve plunger 46 reciprocates.

The pressure fluid entering through pipe 36 upsets the ball check valve 42 overcoming the resistance of spring 41 contained in the spring chamber 38 which latter is closed by the cap plug 39. The pressure fluid then passes through the transverse duct 35 and directly out through the outlet port 64 into the line to the piston cylinder.

Plunger 46 may reciprocate through the transverse chamber 23 in the manner previously described. The chamber 23 has a peripheral enlargement forming a chamber 65 which is opposite the inlet-outlet pipe 36 and connected to the latter through a discharge duct 66.

The upper edge 67 of the chamber 65 forms a valve seat for the plunger 46. The rod 47 on the upper end of the plunger 46 passes through the bearing 45 above the chamber 23 in the manner already described. The plunger is held down by the spring cap 52 supporting the spring 53. The spring plate 51 resting on the spring 53 is held in adjusted position by means of the set screw 64 passing through the end cap 50 and held in adjusted position by the jam nut 55.

The plunger 46 has a large passageway 60 and a radial outlet passageway 61 connecting at its outer end with the high pressure side of the chamber 23.

The lower end of the casing 63 is screw-threaded to hold a cap 68.

In both forms of the invention, the rate of flow discharging through this flow-control valve is controlled by the condition of pressure on the high side of the valve as adjusted by the spring 53. By referring to Fig. 7 it will be seen that the hydraulic fluid, such as oil, from the reservoir is delivered under pressure by the pump through the directional control valve or reversing valve. Here the valve is capable of three positions. In one position for hoisting or advancing movement, the fluid passes freely through the valve and to the rate-of-flow or flow-control valve. Here the fluid passes through the check valve across the high side of the regulating valve and to the piston cylinder or another moving part.

In this operation, fluid under high pressure passes through the passageways 61 and 60 into the dash-pot 62 at the bottom of the chamber, thus lifting the valve plunger away from the base 27 and substantially closing the passageway between the plunger 46 and the valve seat 57. In this movement of the plunger the extent of its travel is controlled by the setting of the expansion spring 53 and its adjustment 54.

If now the fluid circuit is cut off from the source of pressure from the pump by shifting the reverse control valve to the holding or closed position, the piston 10 is held in advanced position.

In effecting the reverse direction of the piston 10, the reverse control valve is moved to the third position. The pump is cut off, but the flow-control valve is connected to the return line of the oil reservoir. Check valve 42 is closed under pressure of the spring 41.

Fluid under high pressure passes the valve plunger 46 at a restricted rate of flow.

Since the passageway 61 is materially smaller in capacity than the passage 60, there is a minimum of surging or vibration in the movement of the valve plunger 46.

In this way piston 10 is retracted at a slow rate of speed which is predetermined by the setting of the spring 53.

It is thus well adapted for lowering a load, as the speed of the reversing movement can be controlled in proportion to the weight being lowered, and the predetermined proportioning of escape of the discharge through the regulated flow-controlling valve.

By reason of by-passing the valve through the check valve, speed of travel or reciprocation in the advancing direction is unrestricted.

If it is desired to regulate the speed in both directions of piston movement, a regulating flow-control valve such as has been described can be installed to operate in each direction.

Back pressure in the circuit between the flow-controlling valve and the reversing valve does not affect the position of the plunger to any practical degree.

The preferred form of the invention has been described in detail. However, the principle involved can be embodied in other mechanical arrangements and proportions within the scope of the invention as defined in the following claims.

What I claim is:

1. A flow-control valve comprising a valve casing having an inlet port and an outlet port, a valve cage having one end open to the outlet port, a return passage from the opposite cage end to the inlet port, a by-pass from the inlet port to the first named end of the valve cage, a check-valve in the by-pass, a main valve reciprocable in the valve cage and movable to interrupt flow between opposite ends of the valve cage, a dash-pot at the second end of the valve cage, a spring means at the first named end of the cage for resiliently holding the main valve in the dash-pot, and a restricted passageway through the main valve from the dash-pot end to the opposite end of the main valve.

2. A flow-control valve comprising a valve casing with a chamber, an outlet port from the chamber, an inlet port to the casing, and a connecting inlet duct to the chamber opposite the chamber outlet port, a check-valve between the casing inlet and said chamber inlet duct, a discharge port connecting the chamber with the casing inlet, a valve cage in the chamber separating the chamber outlet and the inlet duct from the discharge port, a passageway connecting one end of the interior of the cage with both the chamber outlet and the inlet duct and a passageway at the second end of the cage connecting with the discharge port, a plug valve reciprocable in the valve cage, a dash-pot at the second end of the cage, spring means for resiliently holding the plug valve in the dash-pot and a restricted passageway through the plug valve to admit high-pressure fluid from the inlet port to the dash-pot for the purpose of moving the plug valve into position to restrict flow of fluid from the high-pressure side of the valve to the discharge port.

3. A flow-control valve comprising a valve casing with a chamber, an outlet port from the chamber, an inlet port to the casing, and a connecting inlet duct to the chamber opposite the chamber outlet port, a check-valve between the casing inlet and said chamber inlet duct, a discharge port connecting the chamber with the casing inlet, a valve cage in the chamber separating the chamber outlet and the inlet duct from the discharge port, peripheral channels on the cage opposite the said outlet and ports, passageways connecting the interior of the cage with the channels, a plug valve reciprocable in the valve cage, a dash-pot at one end of the cage, spring means for resiliently holding the plug valve in the dash-pot, said valve having a shoulder slidable closely within the interior of the cage between the chamber ports, and a restricted passageway through the plug valve to admit high pressure fluid from the inlet port to the dash-pot for the purpose of moving the plug valve into position to restrict flow of fluid from the high-pressure side of the valve to the discharge port.

4. A flow-control valve comprising a valve casing having an inlet port and an outlet port, a valve chamber having one end open to the outlet port, a return passage from the opposite chamber end to the inlet port, a by-pass from the inlet port to the first named end of the valve chamber, a check-valve in the by-pass, a main valve reciprocable in the valve chamber and movable to interrupt flow between opposite ends of the valve chamber, a dash-pot at the second end of the valve chamber, spring means at the first named end of the valve chamber for resiliently holding the main valve in the dash-pot, and a restricted passageway through the main valve from the dash-pot end to the opposite end of the main valve.

ROBERT C. MILLER.

References Cited in the file of this patent

UNITED STATES PATENTS

| Number | Name | Date |
|---|---|---|
| 2,359,017 | Balsiger | Sept. 26, 1944 |
| 2,365,892 | McLeod | Dec. 22, 1944 |
| 2,367,682 | Kehle | Jan. 23, 1945 |
| 2,474,772 | Ashton | June 28, 1949 |